Patented Dec. 8, 1936

2,063,631

UNITED STATES PATENT OFFICE 2,063,631

DIAZO COMPOUNDS AND A PROCESS OF PREPARING THEM

Maximilian Paul Schmidt, Wiesbaden-Biebrich, and Rudolf Zahn, Wiesbaden, Germany, assignors to Kalle & Co. Aktiengesellschaft, Wiesbaden-Biebrich, Germany, a corporation of Germany No Drawing. Application May 22, 1933, Serial No. 672,346. In Germany May 23, 1932

30 Claims.  (Cl. 260—2)

The present invention relates to new diazo compounds and to a process of preparing them.

We have found that new and valuable diazo compounds are obtained by causing an organic compound containing a reactive carbonyl group to react by means of the said carbonyl group with diazo compounds in the presence of an acid condensing agent. Aliphatic and aromatic aldehydes, ketones and quinones are suitable for preparing the new compounds. There may be mentioned, for instance, formaldehyde, acetaldehyde, benzaldehyde and its substitution products, anthraquinone-beta-aldehyde, isatin, phenanthrenequinone, and aceanthrenequinone. The carbonyl compounds may further be substituted by groups, for instance, by nitro, amino, hydroxy, methoxy and sulfo groups. The carbonyl compounds may be used in their monomerous or polymerous form as, for instance, para-formaldehyde. The diazo compounds used are particularly those which still contain, besides the diazo group, groups that generally facilitate the condensation, as for instance, hydroxy groups or amino groups. The amino groups may further be substituted by aliphatic or aromatic radicals, for instance, methyl groups, benzyl groups and phenyl groups substituted or not. The aromatic nucleus of the diazo compound may also contain substituents, as for instance the methyl group, a halogen atom, the sulfo group or the carboxyl group. It is advantageous that in the diazo compound, if it is substituted by a hydroxy group or an amino group, an ortho-position or a para-position to this substituent is free.

The condensation is carried out in an acid medium, for instance, in hydrochloric acid or sulfuric acid. Most of these reactions occur even at room temperature. According to the course of the reaction it may, however, be useful to accelerate the latter by heating or to reduce its violence by cooling.

As the said bodies with a reactive carbonyl group are capable of reacting in different ways, more or less high molecular products are obtained according to the quantitative proportions and the reaction conditions applied. These high-molecular products are in most cases of a resinous character and generally yield solutions which do not diffuse through a semi-permeable membrane. The process of their preparation probably takes place in such a way, that the compound containing the carbonyl acts with this carbonyl group upon the aromatic diazo compound in a manner similar to that in the preparation of artificial resins, as for instance phenol resins.

Thus, there are, for instance, obtained from formaldehyde and 4-diazo-1,1'-diphenylamine in aqueous hydrochloric acid products which are readily soluble in water and alcohol.

When sulfuric acid of 66° Bé. is employed as the condensing agent, similar products are obtained by using the formaldehyde in the form of a 40% aqueous solution or applying one molecular proportion of para-formaldehyde for 2 molecular proportions of diazo compound and allowing the reaction to occur only during a short time. If the reaction is allowed to proceed in the last mentioned case for a longer time, there are first obtained products which are still soluble in water, but insoluble in alcohol, and finally compounds which are insoluble in all solvents usually employed. When an excess of para-formaldehyde is used for the condensation in sulfuric acid, products are obtained which are readily soluble in water even if the reaction lasts somewhat longer.

The products obtained according to the present invention are intended to be employed for photochemical purposes and in dyestuff chemistry.

The use of the new products described herein in light-sensitive material for the preparation of tanning pictures is described and claimed in the co-pending application Serial No. 644,920 of one of the present inventors, filed November 29, 1932.

The following examples illustrate the invention, but they are not intended to limit it thereto. The parts are by weight unless otherwise stated:

(1) 30 parts of the sulfate of the diazo compound from 4-amino-1,1'-diphenylamine are mixed with 4 parts of para-formaldehyde and the mixture is gradually introduced into 50 parts by volume of cooled sulfuric acid of 66° Bé., care being taken that the temperature does not exceed +7° C. When all of the mixture is introduced, cooling is continued until the temperature begins to fall and the whole is allowed to stand for 24 hours at room temperature. The diazo compound is obtained by pouring on ice, whereby the main part of it separates in an amorphous form; small quantities of the diazo compound can still be separated by addition of common salt to the mother liquor. The diazo compound obtained is readily soluble in water and is precipitated from the solution by means of alcohol. When coupled with phloroglucin on filter paper the new body differs from the corresponding coupling product of the parent material by the fact that it has a duller brown tint and has no marginal zone of a different coloration. The resin-like character of the new diazo compound proves that the latter is high-molecular. It cannot be obtained in a crystalline state and is, therefore, supposed to have a structure analogous to that of formaldehyde resins. Unlike the starting material, it does not diffuse through semi-permeable membranes.

(2) 12 parts of the cadmium chloride salt of the unilaterally diazotized para-phenylenediamine are dissolved in 25 parts by volume of sulfuric acid of 66° Bé. and 2 parts of paraformaldehyde are added. After standing for a prolonged time the mixture is poured onto ice and the diazo compound is precipitated with an excess of cadmium chloride. The diazo compound differs from the starting material by the fact that its yellow coloration is more intense and that the dyestuff obtained with R-salt does not alter its shade with acetic acid of 50 per cent. strength. The coupling product of the parent material with R-salt is, like that of the body obtained, dull violet; it turns, however, to brown on addition of acetic acid of 50 per cent. strength.

(3) 15 parts of the sulfate of 4-diazo-1,1'-diphenylamine are dissolved in 25 parts by volume of sulfuric acid of 66° Bé. and 8 parts of isatin are added to the solution. The mixture is stirred until it uniformly couples with phloroglucin which is proven by the fact that a solution of the dyestuff obtained by coupling a sample of the condensation product with phloroglucin, when poured on paper, does not show a margin colored in a shade different from that of the dyestuff itself. When poured on ice the diazo compound separates in the form of yellow amorphous flakes. It is sparingly soluble in cold water and better soluble in hot water. The dyestuff obtained with phloroglucin is dull reddish-brown and becomes duller and bluer on addition of acetic acid of 50 per cent. strength.

(4) 15 parts of para-chlorobenzenesulfonate of the diazo compound from para-aminophenol acid, obtained by sulfonating phenanthrenequinone, are added to a solution of 15 parts of 4- is mixed with 3 parts of para-formaldehyde. After a short time the formation of the new product is complete. It couples with R-salt so as to form an intense red product, whereas the starting material couples only very slowly and with formation of a slightly colored product. The mixture is poured on ice and salted out.

(5) 15 parts of phenanthrenequinonesulfonic acid, obtained by sulfonating phenanthrenequinone, are added to a solution of 15 parts of 4-diazo-1,1'-diphenylaminesulfate in 25 parts by volume of sulfuric acid of 66° Bé. The reaction proceeds very quickly; the new compound is obtained by pouring the batch on ice. It is a brownish-yellow powder, difficultly soluble in water, but soluble if alcohol is added. It yields with phloroglucin a dull brownish-violet coupling product. On addition of acetic acid of 50 per cent. strength the coloration turns to a dull blue.

(6) 30 parts of 4-diazo-1,1'-diphenylaminesulfate are dissolved, while cooling, in 60 parts by volume of sulfuric acid of 66° Bé., whereafter 12 parts of acetophenone are added to the solution. The reaction proceeds slowly; therefore, the batch is allowed to stand for a prolonged time. The mass is then poured on ice and the yellow product which separates is filtered. The new product is very difficultly soluble in water. It couples with phloroglucin to a brown substance which has a yellower hue than the dyestuff obtained by coupling the parent material with phloroglucin.

(7) 8 parts of the zinc chloride double salt of 3-diazo-carbazole are introduced into 75 arts by volume of sulfuric acid of 66° Bé. The temperature of the sulfuric acid is kept by cooling at 5° C. to 8° C. and 2 parts of para-formaldehyde are added. When the temperature begins to fall, stirring is continued for 3 hours and the mass is poured on ice, whereby the new diazo compound precipitates which is filtered by suction and dried. It has likewise a yellow coloration. It differs from the starting material particularly by its being less soluble.

(8) 15 parts of the hydrochloride of 4-diazo-2,6-dichloro-1,1'-diphenylamine are introduced into 20 parts by volume of sulfuric acid of 66° Bé. The mixture is cooled and 2 parts of para-formaldehyde are added, care being taken that the temperature does not exceed 10° C. When the main reaction is complete, stirring is continued for 4 hours and the product is poured on ice. The new diazo compound partly separates; the portion thereof which remains in solution may be salted out by means of sodium sulfate. It couples with phloroglucin so as to form a product which is yellower and clearer than the product obtained by coupling the starting material with phloroglucin.

(9) 18 parts of the zinc chloride double salt of metadiazofluorene (cf. "Berichte der Deutschen Chemischen Gesellschaft", volume 34, page 1760) are dissolved, while cooling, in 30 parts by volume of sulfuric acid of 66° Bé. 2 parts of para-formaldehyde are added to the solution while maintaining a temperature of 10° C. at the most. The originally colorless solution thereby assumes a dark brown coloration. When all of the aldehyde is introduced, stirring is continued for 2 hours and the product is poured on ice, whereby the new diazo compound is precipitated. It is a dark substance which, unlike the starting material, is very sparingly soluble.

(10) 11 parts of ortho-aminophenol are introduced into 30 parts by volume of sulfuric acid 1:3 (1 part by volume of $H_2O$: 3 parts by volume of $H_2SO_4$) and the solution is diazotized at 0° C. by cautiously introducing 7 parts of sodium nitrite. When the diazotization is finished, 3 parts of para-formaldehyde are added and 50 parts by volume of concentrated sulfuric acid are slowly run in at a temperature below 5° C. After some time the condensation is finished. The product is poured on ice and the orange, difficultly soluble diazo compound is obtained. Its coupling product with R-salt is appreciably redder than the product obtained by coupling the starting material with R-salt.

(11) 15 parts of diazochrysenesulfate, obtained by diazotizing aminochrysene and salting out the diazo solution with sodium sulfate, are dissolved at 0° C. in 30 parts by volume of concentrated sulfuric acid and 2.5 parts of para-formaldehyde are added to the solution. After a short time the reaction is finished; by pouring the product on ice the new diazo compound is obtained in the form of a difficultly soluble, yellow, amorphous powder. In coupling reactions the new product scarcely differs from the starting material.

(12) 12 parts of diazopyrenesulfate, obtained by diazotizing amino-pyrene, are dissolved at 0° C. in 40 parts by volume of concentrated sulfuric acid and 2 parts of formaldehyde are added to the solution. The condensation proceeds quickly. The product is poured on ice, whereby the new diazo compound is precipitated. It is orange colored and almost insoluble. The coupling reactions of the new compound are scarcely different from those of the starting material.

We claim:

1. The process of preparing diazo compounds which comprises causing an organic compound containing a reactive carbonyl group to act with the said carbonyl group upon an aromatic diazo compound in the presence of an acid condensing agent.

2. The process of preparing diazo compounds which comprises causing an organic compound containing a reactive carbonyl group to act with the said carbonyl group upon an aromatic diazo compound containing at least one hydroxy group in the presence of an acid condensing agent.

3. The process of preparing diazo compounds which comprises causing an organic compound of the following general formula:

wherein $R_1$ and $R_2$ each stand for hydrogen, an aliphatic or an aromatic radical, to act with its carbonyl group upon an aromatic diazo compound containing at least one hydroxy group in the presence of an acid condensing agent.

4. The process of preparing diazo compounds which comprises causing an organic compound of the following general formula:

wherein $R_1$ and $R_2$ each stand for hydrogen, an aliphatic or an aromatic radical, to act with its carbonyl group upon an aromatic diazo compound containing at least one hydroxy group and at least one free para-position in relation to the said hydroxy group in the presence of an acid condensing agent.

5. The process which comprises causing paraformaldehyde to act upon 1-diazo-4-aminobenzene in the presence of sulfuric acid.

6. The process which comprises causing paraformaldehyde to act upon 4-diazo-1,1'-diphenylamine in the presence of sulfuric acid.

7. The process which comprises causing paraformaldehyde to act upon 1-diazo-4-hydroxybenzene in the presence of sulfuric acid.

8. The condensation products of aromatic diazo compounds containing at least one hydroxy group with organic compounds containing a reactive carbonyl group.

9. The condensation products of aromatic diazo compounds containing at least one hydroxy group with organic compounds of the following general formula:

wherein $R_1$ and $R_2$ each stand for hydrogen, an aliphatic or an aromatic radical.

10. The condensation products of aromatic diazo compounds containing at least one hydroxy group and at least one free para-position in relation to the said hydroxy group with organic compounds of the following general formula:

wherein $R_1$ and $R_2$ each stand for hydrogen, an aliphatic or an aromatic radical.

11. The diazo compound obtained by condensing 1-diazo-4-aminobenzene with para-formaldehyde, being a strongly yellow product of high-molecular weight and of a resinous character.

12. The diazo compound obtained by condensing 4-diazo-1,1'-diphenylamine with para-formaldehyde, being an amorphous product soluble in water and of a high-molecular weight and of a resinous character.

13. The diazo compound obtained by condensing 1-diazo-4-hydroxybenzene with para-formaldehyde, possessing a strong coupling power and being of high-molecular weight and of a resinous character.

14. The process of preparing diazo compounds which comprises causing an organic compound containing a reactive carbonyl group to act with the said carbonyl group upon an aromatic diazo compound containing at least one amino group in the presence of an acid condensing agent.

15. The process of preparing diazo compounds which comprises causing an organic compound of the following general formula:

wherein $R_1$ and $R_2$ each stand for hydrogen, an aliphatic or an aromatic radical, to act with its carbonyl group upon an aromatic diazo compound containing at least one amino group in the presence of an acid condensing agent.

16. The process of preparing diazo compounds which comprises causing an organic compound of the following general formula:

wherein $R_1$ and $R_2$ each stand for hydrogen, an aliphatic or an aromatic radical, to act with its carbonyl group upon an aromatic diazo compound containing at least one hydroxy group and at least one free ortho-position in relation to the said hydroxy group in the presence of an acid condensing agent.

17. The process of preparing diazo compounds which comprises causing an organic compound of the following general formula:

wherein $R_1$ and $R_2$ each stand for hydrogen, an aliphatic or an aromatic radical, to act with its carbonyl group upon an aromatic diazo compound containing at least one amino group which may be substituted by an aromatic radical and at least one free para-position in relation to the said amino group in the presence of an acid condensing agent.

18. The process of preparing diazo compounds which comprises causing an organic compound of the following general formula:

wherein $R_1$ and $R_2$ each stand for hydrogen, an aliphatic or an aromatic radical, to act with its carbonyl group upon an aromatic diazo compound containing at least one amino group which may be substituted by an aromatic radical and at least one free ortho-position in relation to the said amino group in the presence of an acid condensing agent.

19. The condensation products of aromatic diazo compounds containing at least one amino group with organic compounds containing a reactive carbonyl group.

20. The condensation products of aromatic diazo compounds containing at least one amino group with organic compounds of the following general formula:

wherein R₁ and R₂ each stand for hydrogen, an aliphatic or an aromatic radical.

21. The condensation products of aromatic diazo compounds containing at least one hydroxy group and at least one free ortho-position in relation to the said hydroxy group with organic compounds of the following general formula:

wherein R₁ and R₂ each stand for hydrogen, an aliphatic or an aromatic radical.

22. The condensation products of aromatic diazo compounds containing at least one amino group which may be substituted by an aromatic radical and at least one free para-position in relation to the said amino group with organic compounds of the following general formula:

wherein R₁ and R₂ each stand for hydrogen, an aliphatic or an aromatic radical.

23. The condensation products of aromatic diazo compounds containing at least one amino group which may be substituted by an aromatic radical and at least one free ortho-position in relation to the said amino group with organic compounds of the following general formula:

wherein R₁ and R₂ each stand for hydrogen, an aliphatic or aromatic radical.

24. The process of preparing diazo compounds which comprises causing an organic compound of the following general formula:

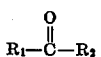

wherein R₁ and R₂ each stand for hydrogen, an aliphatic or an aromatic radical, to act with its carbonyl group upon a diazo compound of the following general formula:

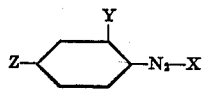

wherein X stands for an inorganic acid radical, Y for hydrogen or a hydroxy group and Z for hydrogen, a hydroxy group or an amino group, but wherein one of the letters Y and Z stands for hydrogen, in the presence of an acid condensing agent.

25. The process of preparing diazo compounds which comprises causing an organic aldehyde to act with its carbonyl group upon a diazo compound of the following general formula:

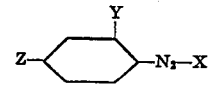

wherein X stands for an inorganic acid radical, Y for hydrogen or a hydroxy group and Z for hydrogen, a hydroxy group or an amino group, but wherein one of the letters Y and Z stands for hydrogen, in the presence of an acid condensing agent.

26. The process of preparing diazo compounds which comprises causing an aliphatic aldehyde to act upon a diazo compound of the following general formula:

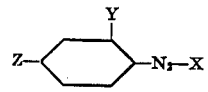

wherein X stands for an inorganic acid radical, Y for hydrogen or a hydroxy group and Z for hydrogen, a hydroxy group or an amino group, but wherein one of the letters Y and Z stands for hydrogen, in the presence of an acid condensing agent.

27. The condensation products of an organic compound of the following general formula:

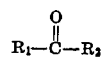

wherein R₁ and R₂ each stand for hydrogen, an aliphatic or an aromatic radical, with a diazo compound of the following general formula:

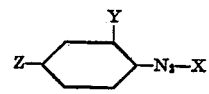

wherein X stands for an inorganic acid radical, Y for hydrogen or a hydroxy group and Z for hydrogen, a hydroxy group or an amino group, but wherein one of the letters Y and Z stands for hydrogen.

28. The condensation products of aromatic diazo compounds with organic compounds containing a reactive carbonyl group.

29. The condensation products of an organic aldehyde with a diazo compound of the following general formula:

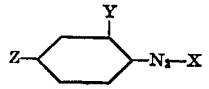

wherein X stands for an inorganic acid radical, Y for hydrogen or a hydroxy group and Z for hydrogen, a hydroxy group or an amino group, but wherein one of the letters Y and Z stands for hydrogen.

30. The condensation products of an aliphatic aldehyde with a diazo compound of the following general formula:

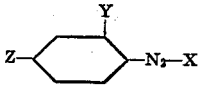

wherein X stands for an inorganic acid radical, Y for hydrogen or a hydroxy group and Z for hydrogen, a hydroxy group or an amino group, but wherein one of the letters Y and Z stands for hydrogen.

MAXIMILIAN PAUL SCHMIDT.
RUDOLF ZAHN.

Certificate of Correction

Patent No. 2,063,631.    December 8, 1936.

MAXIMILIAN PAUL SCHMIDT ET AL.

It is hereby certified that error appears in the printed specification of the above numbered patent requiring correction as follows: Page 2, first column, lines 41 and 42, for the words and hyphen "acid, obtained by sulfonating phenanthrenequinone, are added to a solution of 15 parts of 4-" read *are dissolved, while cooling, in 20 parts by volume of sulfuric acid of 66° Bé. and the solution*; and that the said Letters Patent should be read with this correction therein that the same may conform to the record of the case in the Patent Office.

Signed and sealed this 16th day of March, A. D. 1937.

[SEAL]

HENRY VAN ARSDALE,
*Acting Commissioner of Patents.*